(12) United States Patent
Turgeman

(10) Patent No.: US 10,164,985 B2
(45) Date of Patent: Dec. 25, 2018

(54) DEVICE, SYSTEM, AND METHOD OF RECOVERY AND RESETTING OF USER AUTHENTICATION FACTOR

(71) Applicant: BioCatch Ltd., Tel Aviv (IL)

(72) Inventor: Avi Turgeman, Cambridge, MA (US)

(73) Assignee: BIOCATCH LTD., Tel Aviv (IL)

( * ) Notice: Subject to any disclaimer, the term of this patent is extended or adjusted under 35 U.S.C. 154(b) by 186 days.

(21) Appl. No.: 15/182,624

(22) Filed: Jun. 15, 2016

(65) Prior Publication Data

US 2016/0294837 A1 Oct. 6, 2016

Related U.S. Application Data

(63) Continuation-in-part of application No. 15/051,700, filed on Feb. 24, 2016, and a continuation-in-part of
(Continued)

(51) Int. Cl.
*H04N 7/16* (2011.01)
*G06F 17/30* (2006.01)
(Continued)

(52) U.S. Cl.
CPC .......... *H04L 63/102* (2013.01); *G06F 3/0481* (2013.01); *G06F 3/0486* (2013.01);
(Continued)

(58) Field of Classification Search
CPC ............... H04L 63/102; H04L 63/0861; H04L 63/1408; H04L 63/0428; H04L 63/083;
(Continued)

(56) References Cited

U.S. PATENT DOCUMENTS 3,618,019 A 11/1971 Nemirovsky et al.
3,699,517 A 10/1972 Dyche
(Continued)

FOREIGN PATENT DOCUMENTS

EP 2410450 1/2012
EP 2477136 7/2012
(Continued)

OTHER PUBLICATIONS

Sungzoon Cho, Artificial Rhythms and Cues for Keystroke Dynamics based Authentication; Springer: 2006; p. 1-7.*
(Continued)

*Primary Examiner* — Monjur Rahim
(74) *Attorney, Agent, or Firm* — Eitan Mehulal Sadot

(57) ABSTRACT

Devices, systems, and methods of password recovery and password reset, as well as resetting or recovering other types of user-authentication factor. A system monitors and tracks user-interactions that are performed by a user of an electronic device or a computerized service. The system defines a user-specific task or challenge, in which the user is requested to enter a phrase or perform a task. A user-specific feature is extracted from the manner in which the user performs the task. Subsequently, that user-specific feature is utilized instead of a security question, in order to verify the identity of the user and to allow the user to perform password reset or to perform a reset of another user-authentication factor; by presenting to the user the same task or a similar task, and monitoring the manner in which the user performs the fresh task.

7 Claims, 2 Drawing Sheets

Related U.S. Application Data application No. 14/325,397, filed on Jul. 8, 2014, now Pat. No. 9,450,971, and a continuation-in-part of application No. 13/922,271, filed on Jun. 20, 2013, now Pat. No. 8,938,787, and a continuation-in-part of application No. 13/877,676, filed as application No. PCT/IL2011/000907 on Nov. 29, 2011, said application No. 14/325,397 is a continuation-in-part of application No. 14/320,653, filed on Jul. 1, 2014, now Pat. No. 9,275,337, and a continuation-in-part of application No. 14/320,656, filed on Jul. 1, 2014, now Pat. No. 9,665,703.

(60) Provisional application No. 61/843,915, filed on Jul. 9, 2013, provisional application No. 61/417,479, filed on Nov. 29, 2010.

(51) Int. Cl.
| | | |
|---|---|---|
| *G06F 7/04* | (2006.01) | |
| *H04L 29/06* | (2006.01) | |
| *G06F 21/32* | (2013.01) | |
| *G07C 9/00* | (2006.01) | |
| *G06F 3/0481* | (2013.01) | |
| *G06F 3/0486* | (2013.01) | |
| *G06F 21/31* | (2013.01) | |
| *G06F 3/0488* | (2013.01) | |
| *G06F 3/0484* | (2013.01) | |

(52) U.S. Cl.
CPC ...... *G06F 3/04842* (2013.01); *G06F 3/04886* (2013.01); *G06F 21/31* (2013.01); *G06F 21/316* (2013.01); *G06F 21/32* (2013.01); *G07C 9/00142* (2013.01); *H04L 63/0861* (2013.01); *H04L 63/1408* (2013.01); *G06F 2221/2103* (2013.01); *G06F 2221/2131* (2013.01); *G06F 2221/2133* (2013.01); *H04L 63/0428* (2013.01); *H04L 63/083* (2013.01)

(58) Field of Classification Search
CPC .. G06F 3/0481; G06F 3/04842; G06F 3/0486; G06F 21/31; G06F 3/04886; G06F 21/316; G06F 21/32; G06F 2221/2103; G06F 2221/2131; G06F 2221/2133; G07C 9/00142
USPC ........................................................ 726/26
See application file for complete search history.

(56) References Cited

U.S. PATENT DOCUMENTS

| | | | |
|---|---|---|---|
| 3,983,535 A | 9/1976 | Herbst et al. | |
| 4,128,829 A | 12/1978 | Herbst et al. | |
| 4,621,334 A | 11/1986 | Garcia | |
| 4,760,386 A | 7/1988 | Heath et al. | |
| 4,805,222 A | 2/1989 | Young et al. | |
| 5,485,171 A | 1/1996 | Copper et al. | |
| 5,557,686 A | 9/1996 | Brown et al. | |
| 5,838,306 A | 11/1998 | O'Connor et al. | |
| 5,874,941 A | 2/1999 | Yamada | |
| 6,337,686 B2 | 1/2002 | Wong et al. | |
| 6,337,919 B1 | 1/2002 | Dunton | |
| 6,442,692 B1* | 8/2002 | Zilberman ............ G06F 21/316 713/184 |
| 6,572,014 B1 | 6/2003 | Lambert | |
| 6,819,219 B1 | 11/2004 | Bolle | |
| 6,895,514 B1* | 5/2005 | Kermani ............... G06F 21/316 726/19 |
| 6,938,061 B1 | 8/2005 | Rumynin et al. | |
| 6,938,159 B1 | 8/2005 | O'Connor et al. | |
| 6,957,185 B1 | 10/2005 | Labaton | |
| 6,957,186 B1 | 10/2005 | Guheen et al. | |
| 6,983,061 B2 | 1/2006 | Ikegami et al. | |
| 7,130,452 B2 | 10/2006 | Bolle et al. | |
| 7,133,792 B2 | 11/2006 | Murakami et al. | |
| 7,139,916 B2 | 11/2006 | Billingsley et al. | |
| 7,245,218 B2 | 7/2007 | Ikehara et al. | |
| 7,494,061 B2 | 2/2009 | Reinhold | |
| 7,523,191 B1* | 4/2009 | Thomas ............... G06F 11/3438 709/202 |
| 7,606,915 B1 | 10/2009 | Calinov et al. | |
| 7,796,013 B2 | 9/2010 | Murakami et al. | |
| 7,818,290 B2 | 10/2010 | Davis et al. | |
| 8,417,960 B2 | 4/2013 | Takahashi et al. | |
| 8,433,785 B2 | 4/2013 | Awadallah et al. | |
| 8,510,113 B1 | 8/2013 | Conkie et al. | |
| 8,548,208 B2 | 10/2013 | Schultz | |
| 9,154,534 B1 | 10/2015 | Gayles et al. | |
| 9,174,123 B2 | 11/2015 | Nasiri et al. | |
| 9,282,112 B2 | 3/2016 | Filatov | |
| 9,301,140 B1 | 3/2016 | Costigan et al. | |
| 9,304,915 B2 | 4/2016 | Adams et al. | |
| 2001/0004733 A1 | 6/2001 | Eldering | |
| 2002/0089412 A1 | 7/2002 | Heger et al. | |
| 2003/0033526 A1 | 2/2003 | French et al. | |
| 2003/0074201 A1 | 4/2003 | Grashey et al. | |
| 2003/0212811 A1 | 11/2003 | Thornton | |
| 2004/0015714 A1 | 1/2004 | Abraham et al. | |
| 2004/0062423 A1 | 4/2004 | Doi | |
| 2004/0111523 A1 | 6/2004 | Hall et al. | |
| 2004/0143737 A1* | 7/2004 | Teicher ............... G06K 7/1095 713/167 |
| 2005/0008148 A1 | 1/2005 | Jacobson | |
| 2005/0179657 A1 | 8/2005 | Russo et al. | |
| 2005/0289264 A1 | 12/2005 | Illowsky et al. | |
| 2006/0006803 A1 | 1/2006 | Huang et al. | |
| 2006/0143454 A1 | 6/2006 | Walmsley | |
| 2006/0195328 A1 | 8/2006 | Abraham et al. | |
| 2006/0215886 A1 | 9/2006 | Black | |
| 2006/0224898 A1* | 10/2006 | Ahmed ............... G06F 21/316 713/186 |
| 2006/0282660 A1 | 12/2006 | Varghese et al. | |
| 2006/0284969 A1 | 12/2006 | Kim et al. | |
| 2007/0183633 A1 | 8/2007 | Hoffmann | |
| 2007/0214426 A1 | 9/2007 | Ruelle et al. | |
| 2007/0240230 A1* | 10/2007 | O'Connell ........... G06F 21/55 726/28 |
| 2007/0255821 A1 | 11/2007 | Ge et al. | |
| 2007/0266305 A1 | 11/2007 | Cong et al. | |
| 2007/0271466 A1 | 11/2007 | Mak et al. | |
| 2007/0283416 A1 | 12/2007 | Renaud | |
| 2008/0091639 A1 | 4/2008 | Davis et al. | |
| 2008/0092209 A1 | 4/2008 | Davis et al. | |
| 2008/0092245 A1* | 4/2008 | Alward ............... G06F 21/316 726/28 |
| 2008/0120717 A1* | 5/2008 | Shakkarwar ............ G06F 21/33 726/18 |
| 2008/0162449 A1 | 7/2008 | Chao-Yu et al. | |
| 2008/0183745 A1 | 7/2008 | Cancel et al. | |
| 2008/0211766 A1 | 9/2008 | Westerman et al. | |
| 2008/0215576 A1 | 9/2008 | Zhao et al. | |
| 2008/0263636 A1* | 10/2008 | Gusler ............... G06F 21/316 726/4 |
| 2008/0298588 A1* | 12/2008 | Shakkarwar ........... G06Q 20/02 380/255 |
| 2008/0301808 A1 | 12/2008 | Calo et al. | |
| 2009/0089879 A1 | 4/2009 | Wang et al. | |
| 2009/0094311 A1 | 4/2009 | Awadallah et al. | |
| 2009/0189736 A1 | 7/2009 | Hayashi | |
| 2009/0199296 A1 | 8/2009 | Xie et al. | |
| 2009/0227232 A1* | 9/2009 | Matas .................. H04M 1/665 455/411 |
| 2009/0254336 A1 | 10/2009 | Dumais et al. | |
| 2009/0293119 A1 | 11/2009 | Jonsson | |
| 2009/0320123 A1 | 12/2009 | Yu et al. | |
| 2010/0042403 A1 | 2/2010 | Chandrasekar et al. | |
| 2010/0046806 A1 | 2/2010 | Baughman et al. | |
| 2010/0077470 A1 | 3/2010 | Kozat et al. | |
| 2010/0082747 A1 | 4/2010 | Yue et al. | |

(56) References Cited

U.S. PATENT DOCUMENTS

| | | |
|---|---|---|
| 2010/0082998 A1 | 4/2010 | Kohavi |
| 2010/0122082 A1 | 5/2010 | Deng et al. |
| 2010/0125816 A1 | 5/2010 | Bezos |
| 2010/0269165 A1* | 10/2010 | Chen .................... G06F 21/316 726/7 |
| 2010/0281539 A1 | 11/2010 | Burns et al. |
| 2010/0328074 A1 | 12/2010 | Johnson et al. |
| 2011/0012829 A1 | 1/2011 | Yao |
| 2011/0016320 A1 | 1/2011 | Bergsten et al. |
| 2011/0016534 A1* | 1/2011 | Jakobsson ............ G06F 21/316 726/28 |
| 2011/0023115 A1 | 1/2011 | Wright |
| 2011/0029902 A1* | 2/2011 | Bailey .................... G06F 21/36 715/764 |
| 2011/0063211 A1 | 3/2011 | Hoerl et al. |
| 2011/0065504 A1 | 3/2011 | Dugan et al. |
| 2011/0102570 A1 | 5/2011 | Wilf et al. |
| 2011/0113388 A1 | 5/2011 | Eisen et al. |
| 2011/0154273 A1 | 6/2011 | Aburada et al. |
| 2011/0162076 A1 | 6/2011 | Song et al. |
| 2011/0191820 A1 | 8/2011 | Ivey |
| 2011/0193737 A1 | 8/2011 | Chiueh |
| 2011/0202453 A1 | 8/2011 | Issa et al. |
| 2011/0225644 A1* | 9/2011 | Pullikottil .......... H04L 63/1425 726/11 |
| 2011/0246902 A1 | 10/2011 | Tsai et al. |
| 2011/0251823 A1 | 10/2011 | Davis et al. |
| 2011/0271342 A1 | 11/2011 | Chung et al. |
| 2011/0276414 A1 | 11/2011 | Subbarao et al. |
| 2012/0005483 A1 | 1/2012 | Patvarczki et al. |
| 2012/0054834 A1 | 3/2012 | King |
| 2012/0096555 A1 | 4/2012 | Mahaffey |
| 2012/0133055 A1 | 5/2012 | Machida |
| 2012/0154173 A1 | 6/2012 | Chang et al. |
| 2012/0154273 A1 | 6/2012 | Mcdade et al. |
| 2012/0154823 A1 | 6/2012 | Sakamoto |
| 2012/0167170 A1 | 6/2012 | Shi |
| 2012/0218193 A1 | 8/2012 | Weber et al. |
| 2012/0278804 A1 | 11/2012 | Narayanasamy et al. |
| 2013/0036416 A1 | 2/2013 | Raju et al. |
| 2013/0097682 A1 | 4/2013 | Zeljkovic et al. |
| 2013/0097706 A1 | 4/2013 | Titonis et al. |
| 2013/0111586 A1 | 5/2013 | Jackson |
| 2013/0133055 A1 | 5/2013 | Ali et al. |
| 2013/0135218 A1 | 5/2013 | Jain |
| 2013/0154999 A1 | 6/2013 | Guard |
| 2013/0167212 A1 | 6/2013 | Azar et al. |
| 2013/0305357 A1 | 11/2013 | Ayyagari et al. |
| 2014/0033317 A1 | 1/2014 | Barber |
| 2014/0078061 A1 | 3/2014 | Simons et al. |
| 2014/0078193 A1 | 3/2014 | Barnhoefer et al. |
| 2014/0082369 A1 | 3/2014 | Waclawsky et al. |
| 2014/0143304 A1 | 5/2014 | Hegarty et al. |
| 2014/0196119 A1 | 7/2014 | Hill et al. |
| 2014/0200953 A1 | 7/2014 | Mun |
| 2014/0250538 A1 | 9/2014 | Rapaport et al. |
| 2014/0259130 A1 | 9/2014 | Li et al. |
| 2014/0283059 A1 | 9/2014 | Sambamurthy et al. |
| 2014/0317734 A1 | 10/2014 | Valencia et al. |
| 2014/0344927 A1 | 11/2014 | Turgeman et al. |
| 2015/0012920 A1 | 1/2015 | De Santis et al. |
| 2015/0101031 A1 | 4/2015 | Harjanto et al. |
| 2016/0006800 A1 | 1/2016 | Summers et al. |
| 2016/0042164 A1 | 2/2016 | Goldsmith et al. |
| 2016/0164905 A1 | 6/2016 | Pinney Wood et al. |
| 2016/0164906 A1 | 6/2016 | Pinney Wood et al. |
| 2017/0048272 A1 | 2/2017 | Yamamura et al. |
| 2017/0195354 A1* | 7/2017 | Kesin ................. H04L 63/1425 |

FOREIGN PATENT DOCUMENTS

| | | |
|---|---|---|
| EP | 2610776 | 7/2013 |
| WO | 2007146437 | 12/2007 |
| WO | 2012073233 | 6/2012 |

OTHER PUBLICATIONS

Ahmed et al., "A New Biometric Technology Based on Mouse Dynamics", Jul.-Sep. 2007, IEEE Transactions on Dependable and Secure Computing, vol. 4, No. 3, pp. 165-179.

Bailey, Kyle O., "Computer Based Behavioral Biometric Authentication via Multi-Modal Fusion", Thesis, 2013, Air Force Insitute of Technology.

Stinson et al., "Characterizing Bots' Remote Control Behavior". Detection of Intrusions and Malware, and Vulnerability Assessment. Springer Berlin Heidelberg, p. 89-108. Dec. 31, 2007.

Todorov, "Optimality Principles in Sensorimotor Control (Review)", Sep. 2004, Nature Neuroscience 7, pp. 907-915.

Cleeff et al., "Security Implications of Virtualization: A Literature Study", Science and Engineering, 2009.

Hibbeln et al., "Detecting Deception in Online Environments: Measuring Fraud Through Mouse Cursor Movements", Jun. 7, 2014, Gmunden Retreat on NeuroIS 2014 Gmunden Austria, p. 38.

Ferrie Peter, "Attack on Virtual Machine Emulators", Symantec Technology Exchange, 2007.

Yampolskiy et al., "Behavioural Biometrics: a survey and classification", 2008, International Journal of Biometrics, vol. 1, No. 1, pp. 81-113.

Provos et al., 2007, "The Ghost in the Browser: Analysis of Web-based Malware".

Huang Yao-Wen et al., "Web application security assessment by fault injection and behavior monitoring", 2003, Proceedings of the 12th international conference on World Wide Web, ACM.

Emmanouil Vasilomanolakis, "A honeypot-driven cyber incident monitor: Lessons learned and steps ahead"; Sep. 2015; SIN '15: Proceedings of the 8th International Conference on Security of Information and Networks; Publisher: ACM; pp. 1-7.

Franklin et al., "Remote Detection of Virtual Machine Monitors with Fuzzy benchmarking", ACM SIGOPS Operating Systems Review, V42, Issue 3, Apr. 2008.

Georgia Frantzeskou et al., "Identifying Authorship by Byte-Level N-Grams: The source Code Author Profile (SCAP) Method", Spring 2007, International Journal of Digital Evidence, vol. 6, issue 1.

Liston et al., "On the Cutting Edge: Thwarting Virtual Machine Detection"; retrieved from the Internet on May 3, 2017, from: http://docplayer.net/9791309-On-the-cutting-edge-thwarting-virtual-machine-detection.html.

Zheng et al., "An Efficient User Verification System via Mouse Movements", Oct. 17-21, 2011, CCS' 11, Chicago, Illinois.

Tavis Ormandy, "An Empirical Study into the Security Exposure to Hosts of Hostile Virtualized Environments", retrieved from the Internet on May 3, 2017, from: http://taviso.decsystem.org/virtsec.pdf.

Spafford et al., "Software Forensics: Can We Track Code to its Authors?", Feb. 1992, Computer Science Technical Report, Purdue e-Pubs, Report No. CSD-TR-92-010.

Garfinkel and Rosenblum, "A virtual Machine Introspection-Based Architecture for Intrusion Detection.", 2003, Proc. Network and Distributed Systems Security Symp., The Internet Society, pp. 191-206.

Nance et al., "Virtual Machine Introspection", IEEE Security & Privacy, 2008.

Nakkabi et al., "Improving Mouse Dynamics Biometric Performance Using Variance Reduction via Extractors with Separate Features", Nov. 2010, IEEE Transactions on System, Man, and Cybernetics; vol. 40, No. 6.

International Search Report for application PCT/IL2011/000907 dated Apr. 19, 2012.

International Search Report for application PCT/IB2014/062293 dated Oct. 1, 2014.

International Search Report for application PCT/IB2014/062941 dated Dec. 17, 2014.

International Search Report for application PCT/IB2016/054064 dated Nov. 21, 2016.

* cited by examiner

DEVICE, SYSTEM, AND METHOD OF RECOVERY AND RESETTING OF USER AUTHENTICATION FACTOR

CROSS-REFERENCE TO RELATED APPLICATIONS

This application is a Continuation-in-Part (CIP) of U.S. patent application Ser. No. 15/051,700, filed on Feb. 24, 2016, which is hereby incorporated by reference in its entirety.

This application is a Continuation-in-Part (CIP) of U.S. patent application Ser. No. 14/325,397, filed on Jul. 8, 2014, which is hereby incorporated by reference in its entirety.

The above-mentioned U.S. patent application Ser. No. 14/325,397 claims priority and benefit from U.S. provisional patent application No. 61/843,915, titled "System, Device, and Method of Detecting Identity of a User of an Electronic Device", filed on Jul. 9, 2013, which is hereby incorporated by reference in its entirety.

Additionally, the above-mentioned U.S. patent application Ser. No. 14/325,397 is a Continuation-in-Part (CIP) of U.S. patent application Ser. No. 13/922,271, filed on Jun. 20, 2013, which is hereby incorporated by reference in its entirety.

Additionally, the above-mentioned U.S. patent application Ser. No. 14/325,397 is a Continuation-in-Part (CIP) of U.S. patent application Ser. No. 13/877,676, filed on Apr. 4, 2013; which was a National Phase of PCT International Application number PCT/IL11/00907, filed on Nov. 29, 2011; which claimed priority and benefit from U.S. provisional patent application No. 61/417,479, filed on Nov. 29, 2010; all of which are hereby incorporated by reference in their entirety.

Additionally, the above-mentioned U.S. patent application Ser. No. 14/325,397 is a Continuation-in-Part (CIP) of U.S. patent application Ser. No. 14/320,653, filed on Jul. 1, 2014, titled "Device, system, and method of detecting user identity based on motor-control loop model", which is hereby incorporated by reference in its entirety.

Additionally, the above-mentioned U.S. patent application Ser. No. 14/325,397 is a Continuation-in-Part (CIP) of U.S. patent application Ser. No. 14/320,656, filed on Jul. 1, 2014, titled "Device, system, and method detecting user identity based on inter-page and intra-page navigation patterns", which is hereby incorporated by reference in its entirety.

FIELD

The present invention is related to the field of security of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only an authorized user engages in the activity. For example, a user may be required to enter a username and a password in order to access an email account, or in order to access an online banking interface or website.

SUMMARY

The present invention may include, for example, systems, devices, and methods for password recovery or password reset, or for recovery or reset of other confidential data or secret data or credentials (e.g., Personal Identification Number (PIN) recovery or reset; pass-phrase recovery or reset; username recovery or reset; or the like.)

For demonstrative purposes, portions of the discussion herein may relate to recovery (or reset) of a password or PIN; however, the present invention may be utilized for recovery or reset of any other suitable authentication factor, or user authentication factor, that the user wishes to reset or to recover, or that the user is required to reset or to recover, or that does not work properly or entirely and thus needs to be reset or replaced. Accordingly, the present invention may be used for recovery or reset of various types of user authentication factor(s), such as, for example, password, PIN, pass-phrase, biometric authentication factor, fingerprint authentication factor, image-based or photograph-based authentication factor, voice-based or speech-based authentication factor, retina scan authentication factor, and/or other authentication factors.

The present invention provides devices, systems, and methods of user authentication, and/or detection of user identity. For example, a system or a computing device requires a user to perform a particular unique non-user-defined task. The system monitors user interactions, extracts user-specific features that characterizes the manner in which the user performs the tasks; and subsequently relies on such user-specific features as a means for user authentication, optionally without utilizing a password or passphrase, or as a step in performing password recovery or password reset (e.g., instead of relying on pre-defined security questions). Optionally, a user interface anomaly or interference is intentionally introduced in order to elicit the user to perform corrective gestures, which are optionally used for extraction of additional user-specific features.

Some embodiments may include devices, systems, and methods of detecting user identity, differentiating between users of a computerized service, and detecting a possible attacker. The methods may include, for example: monitoring of user-side input-unit interactions, in general and/or in response to an intentional interference or aberration (e.g., input unit interference, output unit interference, on-screen interference, combined input-output interference) which may be intentionally introduced or injected or added to user-interface elements or to a flow of utilizing an application or website or electronic service. The monitored interactions (e.g., monitored gestures that the user makes, mouse movements, mouse clicks, touch-screen gesture, or the like) and/or their characteristics or attributes (e.g., velocity, acceleration, deceleration, accuracy, inaccuracy, timing, time gaps, smoothness, or the like) may be used for verifying identity of a user, or for differentiating or distinguishing between or among users, or for detecting a fraudulent human user or attacker or imposter, or for detecting a "bot" or automated script or robotic user or emulated user or simulated user or machine-based non-human user.

The present invention may provide other and/or additional benefits or advantages.

DETAILED DESCRIPTION OF THE PRESENT INVENTION

Figure 1:
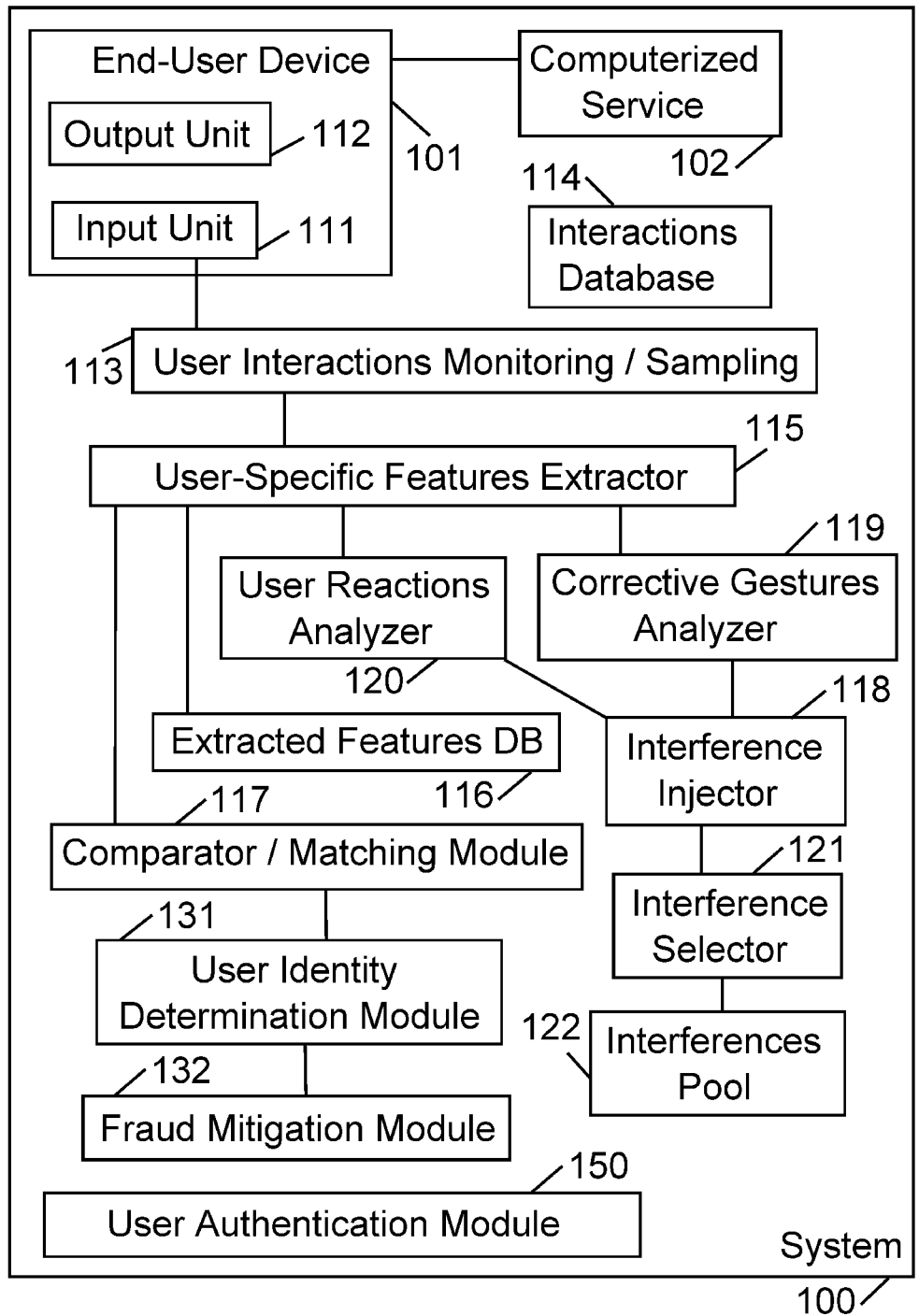
FIG. 1 is a schematic block-diagram illustration of a system, in accordance with some demonstrative embodiments of the present invention.

The term "password" as used herein may be or may comprise, for example, a password or pass-phrase or Personal Identification Number (PIN), or other data-item or secret, or other confidential data-item, which may be used for user authentication or for logging-in or sign-in of a user into an electronic device (e.g., smartphone, tablet, smartwatch, laptop computer, desktop computer) or a service (e.g., banking service or website, brokerage service or website, email account, web-mail, social network, online vendor, online merchant, electronic commerce website or application or "app"), or other data-item or string that may be used as authentication factor or authentication step (e.g., in a single-step or multiple-step authentication process), or other log-in data that may be used in order to authorized access to a privileged service and/or to a privileged location (e.g., entry into, or exit from, or passage through a gate or card-reader or turnstile), or other log-in data item that may be used in order to authorize a user to perfo\rm privileged actions (e.g., to unlock or open a device or a vehicle; to start or ignite a vehicle; to drive a vehicle).

The terms "service" or "computerized service", as used herein, may be or may comprise any suitable service, or system, or device, which may require user authentication in order to authorize user access to it, or in order to authorize performance of one or more particular actions; including, but not limited to, for example, user authentication for accessing or operating or unlocking an electronic device (e.g., smartphone, tablet, smart-watch, laptop computer, desktop computer, smart-home device or appliance, Internet of Things (IoT) device) or service (e.g., banking service or website, brokerage service or website, email account, webmail, social network, online vendor, online merchant, electronic commerce website or application or "app"), or other system or platform that requires user authentication (e.g., entry into, or exit from, or passage through a gate or card-reader or turnstile; to unlock or open a device or a vehicle; to start or ignite a vehicle; to drive a vehicle).

The terms "recovery" or "reset" or "password recovery" or "password reset", as used herein, may relate, for example, to a process in which a user fails to provide a secret data-item (e.g., password or PIN) as a condition for accessing a privileged service or device; and in response to such failure, a user authentication process that is associated with the privileged service or device may present to the user one or more challenges that may enable the privileged service or device to determine that the user who attempts to log-in is indeed the genuine or legitimate user, and not an attacker or imposter or "fraudster"; and may further enable the genuine user to access the privileged service or device, and/or to recover the user's previously-stored password or secret, and/or to reset or modify or create a new password or secret that replaces or over-writes the previously-stored password or secret. The terms of "recovery" or "resetting" or "reset", as used herein, may be utilized not only with regard to a password or PIN or pass-phrase or other secret, but rather, may be utilized also in conjunction with recovery or reset of other type(s) of a user-authentication factor, or of an authentication-factor or authentication-means (e.g., fingerprint, retina scan, face scan, voice-based or speech-based biometric feature, face recognition, or the like), which may need to be bypassed or recovered or reset (e.g., due to failure of the user to authenticate; due to technical problems of the scanner or imager or microphone; due to ambient noise or insufficient ambient light; due to poor lighting condition; due to the user wearing facial accessories or sunglasses or moustache or beard; due to the user's fingers being too oily or too wet or too dry; due to insufficient user-identifying features in a captured sample; due to a requirement by a system administrator to replace a first type of authentication factor with a second, different, type of authentication factor; and/or to achieve other purposes, or due to other reasons).

The Applicants have realized that many users sometimes forget their password, and thus fail to log-in to a service or device. In some conventional systems, a password reset process is typically a cumbersome process, that requires the user to define in advance answers to security questions, and then requires the user to correctly respond to security questions. However, The Applicants have realized that some users fail to remember their own answers to security questions; some users fail to correctly respond to security questions (e.g., due to different spelling; such as, if the original security answer was "New-York" but the user responds later with "New York"); some users change the content of their security questions over time without necessarily updating their online profile (e.g., security question of "What is your favorite song?", the user responded "Macarena" in year 2010, and his current favorite song is a different song).

The Applicants have further realized that in some systems, a process of resetting or recovering a password may be more cumbersome, and may require the user to engage in a telephonic conversation with a fraud department or customer service representative in order to answer a series of questions; and/or to perform other time-consuming tasks (e.g., physically appearing at a bank branch with an identification card).

The Applicants have also realized that in certain situations, even though the user may correctly remember his password or PIN, one or more steps of factors of an authentication process may not work, or may fail to work (temporarily or repeatedly or constantly), or may not operate correctly or sufficiently. For example, a user authentication process may utilize face recognition as one authentication factor out of one-or-more factor(s) for user authentication; but a camera or imager may fail to work, or may not work properly due to poor lighting. For example, a user authentication process may utilize voice recognition or speech recognition as one authentication factor out of one-or-more factor(s) for user authentication; but an acoustic microphone may fail to work, or may not work properly due to ambient noises. For example, a user authentication process may utilize fingerprint(s) as one authentication factor out of one-or-more factor(s) for user authentication; but a fingerprint reader or scanner may fail to work, or may not work properly due to excess moisture or due to the user's hand being too oily or two wet. The Applicants have realized that in such situations, a need may arise for authenticating the user via other means, instead of the authentication factor that failed or that is unavailable or that does not function properly. The Applicants have further realized that in such situation, a need may arise to allow the user to perform recovery or resetting of a user-authentication factor (which may be a password, or a biometric feature, or other previously-defined user-specific feature or user-identifying feature); or to allow the user to perform replacement of a previous user-authentication factor with a new one.

The present invention may enable a user to perform password recovery or password reset, or other user-authentication factor recovery or user-authentication factor reset or user-authentication factor replacement, without requiring the user to remember or to submit one or more secret or confidential data-items, and/or without requiring the user to remember or to submit correct answers to previously-defined security questions.

The present invention may enable a user to submit user-authentication data as an authentication factor, without requiring the user to remember or to submit one or more secret or confidential data-items, and/or without requiring the user to remember or to submit correct answers to previously-defined security questions.

In some embodiments, an enrollment process may be performed in order to request a user to perform one or more tasks or challenges; to record or track the manner in which the user performs them; to extract a user-specific pattern or characteristic; and then, subsequently, to authenticate the user and/or to perform password recovery by presenting to the user the same task or challenge and tracking the user's fresh response, in order to determine whether it is the same genuine user.

The enrollment task may be a "non-hidden challenge", a task such that the user is aware that he is performing a task or challenge that may later be utilized in order to identify or authenticate the user. Additionally or alternatively, the enrollment task may be a "hidden challenge", a task that the user is performing as part of his "natural" or routine interactions with the system, and that the system extracts therefrom a user-specific characteristics, without the user even knowing that the system presents to him a task that may later be used in order to identify or authenticate the user.

In other embodiments, the system may operate without necessarily requiring an enrollment process; and without necessarily requiring the logged-in user (or, a new account-creating user) to perform a challenge tasks. Rather, the system may operate on-the-fly, by extracting one or more user-specific characteristics from interactions of the genuine user; and later, subsequently, to present to the user a challenge that allows the system to look for that user specific characteristic(s) or feature(s) in order to authenticate the user and/or to perform password reset or password recover.

Reference is made to FIG. 1, which is a schematic block-diagram illustration of a system 100 in accordance with some demonstrative embodiments of the present invention. The components of system 100 may be implemented by using suitable hardware units and/or software units; and may be co-located within a single computer device or a single computing system, or may be scattered or distributed across two or more computing devices and/or computing systems. In some embodiments, client-server architecture may be used; such that some of the components and units may be implemented locally at the end-user device, whereas other components and units may be implemented remotely or by using a remote server or a "cloud computing" server or repository or computer. In some embodiments, some modules and functionality may be implemented by utilizing a web-browser, a plug-in or extension or add-on to a web-browser or to an Operating System (OS), by using a native application or a mobile-web application, by using JavaScript and/or CSS and/or HTML5, and/or by using other suitable technologies. Components of system 100 may interact or communicate over one or more wireless communication links, wired communication links, cellular communication, client/server communication, peer-to-peer communication, or the like.

System 100 may enable an end-user device 101 to interact with a computerized service 102. The end-user device 101 may be, for example, a smartphone, a tablet, a laptop computer, a notebook computer, a desktop computer, a cellular phone, a smart-watch (e.g., Apple iWatch), a fitness bracelet (e.g., similar to FitBit or JawBone wearable devices), a wearable device, a portable device, an Augmented Reality (AR) device or glasses or helmet or headgear (e.g., similar to Google Glass), a Virtual Reality (VR) device or glasses or helmet or headgear (e.g., similar to Oculus Rift), or the like. In some embodiments, the end-use device 101 may be a stand-alone machine or interface; a digital kiosk or kiosk-type machine, a vending machine, an Automated Teller Machine (ATM), a point-of-sale (POS) terminal or machine, or the like. In some embodiments, the end-user device 101 may be a point-of-entry terminal, or a user-identification terminal, such as a terminal or scanner or dashboard or touch-screen which may be used for secure physical entry or entrance or passage through a gate or door or lobby or turnstiles or room or corridor, or as part of (or replacement of) a physical entry monitoring system. In yet other embodiments, the end-user device 101 may be or may comprise, or may be comprised in, a vehicle, a vehicular device, a dashboard, a vehicular dashboard, a vehicular computing system, a vehicular computing device, a vehicular ignition unit or system, a vehicular component that is operable in conjunction with a vehicular ignition system, a vehicular immobilizer unit, a vehicular component that is operable in conjunction with a vehicular immobilizer unit, or the like.

The computerized service 102 may be a local and/or a remote computerized platform or service or application or web-site or web-page. The computerized service may be installed locally and entirely on the end-user device 101; or may be installed remotely and entirely on a remote server or a remote computer which is then accessed by the end-user device 101 either via one or more wired and/or wireless communication link(s); or may be a hybrid implementation which utilizes one or more remote components (e.g., a remote Application Server) and one or more local components (e.g., a local native application; a local mobile-web application; a local web-browser).

Some demonstrative and non-limiting examples, of suitable computerizes service(s) which may be used in conjunction with the present invention, may include: banking service, online banking services, retail banking services (e.g., performed within or at an ATM or a branch of a bank); brokerage or online brokerage services; usage and/or access to electronic mail, email, SMS accounts, instant messaging (IM) accounts and services, social networks; an enterprise network or corporate network or organizational network which is available only to employees or authorized users of an organization or enterprise; a members-only network or service, or a paying-members-only service or network, or a premium service, which are available only to certain users and/or to members and/or to paying users; applications and/or websites and/or services that enable or perform payment, electronic payment, utilization of credit card and/or debit card and/or wire transfer and/or electronic funds transfer; applications that access or utilize a secure database storing confidential or non-public information; and/or any suitable electronic service which may be accessed locally and/or remotely by end-user device 101.

In some embodiments, the computerized service 102 need not be external to the end-user device 101, and may be entirely internal to the end-user device 101, or may be the end-user device 101, or may be a particular functionality or a general functionality of the end-user device 101. For example, the end-user device may be a smartphone or tablet; and the computerized service 102 may be one or more features or functionalities or applications of that smartphone or tablets. In some embodiments, the present invention may be used as part of a locking or unlocking mechanism of a smartphone or tablet or other end-user device 101; or as part of a process in which a user unlocks or "wakes up" a hibernating device, or takes the device from reduced-power mode (or from "sleep mode") to fully-operational mode.

End-user device comprises an input unit 111, for example, mouse, keyboard, stylus, touch-screen, multi-touch-screen, trackball, joystick, or the like. End-user device further comprises an output unit 112, for example, monitor, screen, touch-screen, multi-touch-screen, or the like. In some embodiments, the input unit and the output unit may be implemented as the same single unit, for example, as a touch-screen or multi-touch screen.

A user interactions monitoring/sampling module 113 may monitor some or all of the user interactions and/or user gestures; and may record, capture, or otherwise sample such interactions and/or gestures. Optionally, an interactions database 114 may log and/or may store data reflecting the monitored user interactions, for a single user or for multiple users.

User-specific features extractor 115 may extract or estimate user-specific features or traits or characteristics or attributes, that characterize an interaction (or a set or batch or group or flow of interactions, or a session of interactions) of a user with the computerized service 102. Optionally, an extracted features database 116 may store data or records which reflects users and their respective values of extracted (or estimated) user-specific features.

Optionally, a comparator/matching module 117 may compare or match, between (or among): (a) values of user-specific features that are extracted in a current user session (or user interaction), and (b) values of respective previously-captured or previously-extracted user-specific features (of the current user, and/or of other users, and/or of pre-defined sets of values that correspond to known automated scripts or "bots" or known attackers).

The user-specific features, whose values may be compared or matched across usage-sessions, may include, for example, curvature (or curvature radius) of mouse movement or mouse strokes; acceleration and/or speed of mouse movement in one or more directions; smoothness of movement; velocity or speed of gestures; acceleration or deceleration of gestures; rate or frequency of mouse clicks; accuracy or inaccuracy of gestures or clicks, or their relative location (e.g., whether the user typically clicks correctly an on-screen button, or sometimes misses the button and clicks nearby); the particular type of manner that the user chose to convey input (e.g., whether the user clicked on "submit" button, or pressed the "enter" key; or, whether the use moved between form fields by using the "tab" key or by using the mouse cursor); particular sequences of keys or characters that the user enters more rapidly (or more slowly) relative to other characters or sequences; particular manner or pattern in which the user navigates within fields or within a page or an application; and/or other suitable features, for example: device movements or input-unit movement during interaction, movement and/or orientation and/or acceleration of the entire device (e.g., a smartphone or tablet) during the interaction, whether one single finger or multiple particular fingers are used for interacting, the relations between fingers while interacting, the relation to other body parts while interacting, and/or other suitable gesture parameters. Optionally a deep learning algorithm and/or a machine learning algorithm or other suitable Artificial Intelligence (A.I.) algorithm may be utilized, in order to learn and to define a user-specific profile based on the data that is monitored or produced during the interaction (and optionally, immediately prior to the interaction and/or immediately after the interaction); optionally, without necessarily using any specific pre-define features or characteristics or features, and optionally using a heuristic approach or holistic approach or "fuzzy logic" algorithm that attempts to find a unique identifier or a unique digital footprint without necessarily being tied to a specific biometric parameter or to a set of pre-defined biometric parameters. Some embodiments may thus generate a user-specific biometric profile or biometric signature, without pre-defining a set of biometric characteristics or parameters that are then used to calculate the signature or profile; but rather, by utilizing deep learning which utilizes mathematical generation of a unique profile or signature without necessarily defining or pre-defining the set of physical parameters that would be used for differentiating among users.

Optionally, an interference injector 118 may operate to introduce, add, inject, generate and/or otherwise cause an interference (or anomaly, or aberration, or inconsistency, or deviation, or input-output interference, or input/output anomaly) to the input and/or the output as they are reflected to the user who utilizes the end-user device. Such intentionally-introduced input/output interference may be, for example: temporarily hiding or removing the on-screen mouse-pointer or on-screen pointer, in order to elicit the user to react and to make gestures in an attempt to revive the hidden on-screen pointer; intentional deviations or "jumps" in the movement of the on-screen pointer, relative to the actual manual gesture that is performed by the human user (e.g., the human user drags the mouse eastbound, but the on-screen pointer deviates and moves north-east, thereby eliciting a corrective movement or corrective gestures by the user); intentionally moving or re-locating an on-screen interface component (e.g., a "submit" button or a "next" button) while the user is dragging an on-screen pointer; and/or other suitable interferences or anomalies, whose goal is to elicit the user to react and/or to perform corrective steps or corrective gestures; thereby enabling the user-specific features extractor 115 to further extract user-specific attributes or features that characterizes such corrective gestures or such reactions to anomalies; e.g., the time period that it takes the user to notice the anomaly and/or to correct it; the manner in which the user corrects the anomaly (e.g., whether the user tries to locate a disappeared on-screen pointer, by shaking his mouse, or by moving the mouse sideways, or by moving the mouse clockwise, or by moving the mouse counter-clockwise, or by clicking the mouse-button once, or by clicking the mouse-button multiple times, or by typing on the keyboard.

In some embodiments, a corrective gestures analyzer unit 119 may monitor, track, analyze and/or characterize such corrective actions or gestures of the user in response to such interference or anomaly or aberration. In some embodiments, a user reaction analyzer unit 120 may monitor, track, analyze and/or characterize such gestures or reactions of the user in response to such interference (which may not necessarily involve a corrective action). In some embodiments, these functionalities, of the corrective gestures analyzer unit 119 and/or the user reaction analyzer unit 120 may be part of the functionality of the user-specific features extractor 115.

It is noted that in some embodiments, interferences may be injected or used continuously; or may be used only in particular portions or regions of the computerized service (e.g., only on certain pages of a website, or only when certain functionalities of the application are requested, such as high-risk or higher-risk functions); or may be injected pseudo-randomly, or at pre-defined time intervals; or may be injected if one or more other conditions are true (e.g., if there are other indicators of fraudulent activity or irregular activity); or may not be injected at all, for a particular user or for a particular usage-session, or for all users or for a group of users. In some embodiments, optionally, an interference selector module 121 may select or may determine, based on one or more criteria or conditions, whether or not to introduce an interference, or whether (or when exactly, or where exactly) to trigger or to command the interference generator 118 to generate an interference; optionally by selecting a suitable interference from a pre-defined interferences pool 122. For example, the interference selection may be based on user characteristics, and/or based on attributes of the computerized service, and/or based on pseudo-random selection; or by selecting interferences of a type that was not yet used for a particular user, or conversely by selecting interferences of a type that had been already used for a particular user, or by taking into account the level of risk associated with a user-requested functionality of the computerizes service, or the like. The injection of interferences, and/or the analysis of user reactions to interference, and/or the analysis of corrective gestures, may be optional.

If the comparator/matching module 117 determines that one or more features, or a set of features, that characterize the current interaction session of the current user, does not match those features as extracted in previous interaction session(s) of that user, then, a possible-fraud signal may be generated or sent or transmitted to other units of system 100 and/or to pre-defined recipients.

For example, combined factors and data may be taken into account by a user identity determination module 131, which may determine or estimate whether or not the current user is a "fraudster" or an attacker or an imposter. The user identity determination module 131 may trigger or activate a fraud mitigation module 132 able to perform one or more fraud mitigating steps based on that determination or estimation; for example, by requiring the current user to respond to a challenge, to answer security question(s), to contact customer service by phone, to perform two-step authentication or two-factor authentication, or the like.

In accordance with the present invention, system 100 may comprise a user authentication module 150 which may enable system 100 and/or computerized service 102 and/or end-user device 101 to perform user authentication, or to authenticate or verify or confirm the identity of a user of end-user device 101 (or of computerized service 102), and/or to utilize the unique gestures and/or reactions of the user as a user-identifying feature that may authorize a log-in or may authorize access or may authorize a password recover or a password reset process.

The user authentication module 150 may further enable a user to perform password recovery or password reset, or other user-authentication factor recovery or user-authentication factor reset or user-authentication factor replacement, without requiring the user to remember or to submit one or more secret or confidential data-items, and/or without requiring the user to remember or to submit correct answers to previously-defined security questions.

Figure 2:
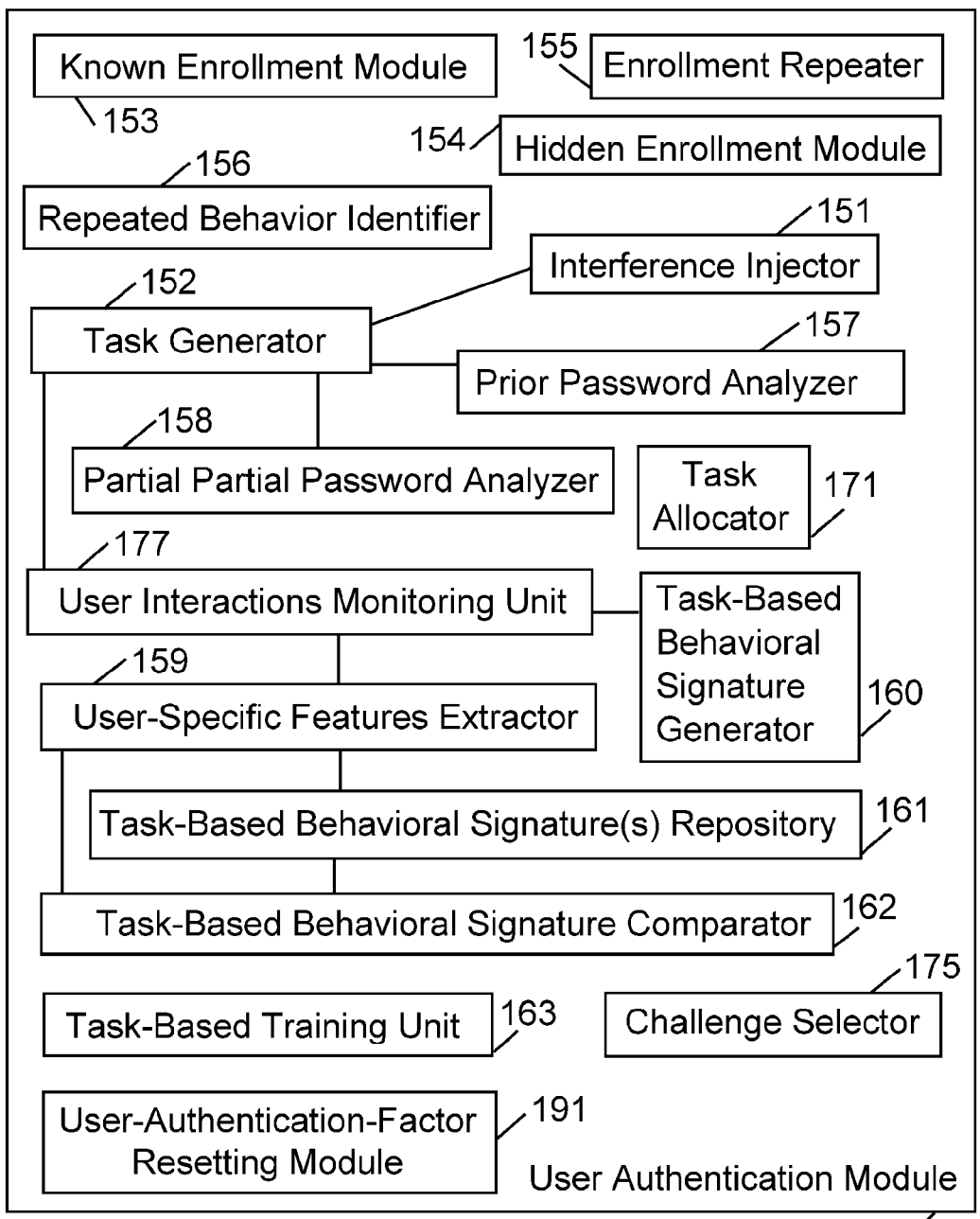
FIG. 2 is a schematic block-diagram illustration of a user authentication module, in accordance with some demonstrative embodiment of the present invention.

Reference is made to FIG. 2, which is a schematic block-diagram illustration of user authentication module 150 and its associated components, in accordance with some demonstrative embodiment of the present invention.

User authentication module 150 may comprise a Task Generator 152 able to generate an on-screen task that the user is required to perform. The task may be or may comprise, for example, a request that the user will move an on-screen pointer from on-screen Point A to on-screen Point B, enabling the system to track the manner in which the user performs the on-screen dragging or moving of the on-screen pointer, and to enable the system to extract a unique user-specific feature from that manner of form such user interactions (e.g., whether the line is straight, or curved, or curved counter-clockwise, or performed using a single stroke or multiple strokes, or performed slowly or rapidly); a request that the user will draw a shape or item or letter or digit or character on the screen by dragging an on-screen pointer (e.g., to draw a circle, a square, a rectangle, a heart, a start, a flower), and to enable the system to monitor the user interactions and to extract from them a user-specific feature (e.g., the number of strokes used, the pattern performed, the speed of movement, the acceleration or tilt of the end-user device while or during or before or after the motion is performed); a request that the user will type a particular word or phrase or string (e.g., "Philadelphia" or "Checking Account"), to enable the system to extract user-specific feature(s) from the typing (e.g., typing speed; whether the user capitalized or did not capitalize certain letters or words; identifying a sequence of several characters that the particular user types faster or slower, compared to his average or median typing speed, or compared to other words that he typed or types, or compared to other users, or compared to a threshold value).

Optionally, an Interference Injector 151 may add or inject or introduce an input/output interference (or anomaly, or aberration, or abnormality, or irregularity) to the behavior of the input unit and/or to the on-screen reflection of the input-unit interactions; such as, causing the on-line pointer to temporarily disappear, or to "jump" and reappear at a different place than expected, or to move at irregular speed or rate or screen-regions, or to have an offset relative to the regular location or route, or to cause an intentional typographical error that the user needs to observe and then correct, and/or other suitable abnormalities; which may then enable the system to monitor and track the user-specific reaction to such injected interference(s), and to extract therefrom one or more user-specific features or characteristics, for example, time to notice the interference, time to correct the interference, method of correction (e.g., moving the mouth sideways, or clockwise, or counter-clockwise; or using the Delete key as opposed to the Backspace key), patterns or manners in which the correction is performed (e.g., rapid correction, slow correction, one-step correction process, multiple-step correction process), or the like.

Optionally, a Known Enrollment Module 153 may operate to perform an enrollment process that is known and visible to the user, and that is not hidden from the user. For example, during a usage session in which the user is already logged in, or during a log-in process of the user, the Known Enrollment Module 153 may require the user to perform a task generated by the Task Generator 152; and may monitor and track the manner and user interactions of performing the task; and may extract from them user-specific feature(s) or characteristic(s). The Known Enrollment Module 153 may require the user to perform the task, and notifies the user that this is a particular challenge that may enable the system to track the gestures of the user in order to obtain user-specific data that may subsequently be used by the system in order to authenticate the user and/or in order to enable password recovery or password reset. Accordingly, the user may be fully aware that the requested task is of a type that may later be used in order to authenticate the user.

Optionally, a Hidden Enrollment Module 154 may operate to perform an enrollment process that is entirely or partially hidden from the user. For example, during a usage session in which the user is already logged in, or during a log-in process of the user, the Known Enrollment Module 153 may require the user to perform a task generated by the Task Generator 152; and may monitor and track the manner and user interactions of performing the task; and may extract from them user-specific feature(s) or characteristic(s). The Hidden Enrollment Module 154 may require the user to perform the task, and does not notify the user that this is a particular challenge that may enable the system to track the gestures of the user in order to obtain user-specific data that may subsequently be used by the system in order to authenticate the user and/or in order to enable password recovery or password reset. Accordingly, the user may not be aware that he is performing an on-screen or input/output task that may later be used for authentication purposes.

Optionally, an Enrollment Repeater 155 may ensure that the enrollment task (e.g., known to the user, or hidden from the user) is performed and repeated over multiple log-in sessions and/or during multiple logged-in sessions and/or during multiple usage sessions; and may ensure that over such multiple performances of the same on-screen task or input/output task, the user-specific feature(s) are extracted and are fine-tuned or learned over time, across such multiple sessions or iterations. Optionally, the Enrollment Repeater 155 may determine and/or may declare, only after K iterations of the enrollment task were performed, that the enrollment task is now ready for actual usage for actual authentication of the user, if the need arises to use it, or if the system otherwise elects to use it (e.g., as an additional or a replacement factor for authentication). The Enrollment Repeater 155 may check whether or not sufficient user-specific feature(s) were extracted or were determined from one or more iterations of the enrollment task, or whether additional iterations or repetitions are required over additional usage sessions or log-in sessions in order to establish such sufficiency.

In some embodiments, a Repeated Behavior Identifier 156 may monitor, track and analyze the user interactions with the service or the device, in order to identify one or more patterns of usage or behavior that are unique to the particular user, and which may then be utilized in order to generate a fresh, never-before-seen, task for authentication purposes. For example, the computerized service may be an email or web-mail account; and the Repeated Behavior Identifier 156 may identify or may determine, from an analysis of user interactions, that user Adam often types the word "Sincerely" in a particular manner (e.g., typing the letters "Sin" rapidly, and then typing the letters "cerely" slowly, compared to threshold values). Subsequently, when user authentication is required, and/or as part of a password recovery or password reset process, the user authentication module 150 may request the user to type the phrase "I sincerely enjoyed the concert", and may monitor the manner in which the user types the word "sincerely", and may determine whether the fresh manner of typing that word matches the previously-identified Repeated Behavior of typing that word; and a match may indicate that this is the genuine user or the same previous user, whereas a mismatch may indicate that the current user is not the genuine user (or is an attacker or impostor). Optionally, a random or pseudo-random sentence or string, that also includes that particular word, may be presented for the user to type, together with other words that may be selected randomly or pseudo-randomly from a suitable dictionary or pool of words or terms.

In some embodiments, a Prior Password Analyzer 157 may operate to track the manner in which the user had entered, in previous usage session(s) and/or in previous log-in sessions, a prior password (or PIN, or user credentials) that were already replaced or modified; and may utilize that particular manner in order to authenticate a user that does not remember his current password. In a demonstrative example, in the year 2014, user Bob created a new email account, and defined his password to be "swordfish". During the year 2014, user Bob has accessed his email account 45 times, and had types his password "swordfish" 45 times during such 45 log-in sessions. The system may track the manner in which user Bob enters his password; and may detect that typically, user Bob enters his password "swordfish" by typing the letters "sword" slowly (e.g., at a rate slower than a threshold value, or at a time-slot longer than a threshold value), and by typing the letters "fish" rapidly (e.g., at a rate faster than a threshold value, or at a time-slot shorter than a threshold value). The system may maintain and keep this unique user-specific information, describing or reflecting the particular manner in which the user Bob enters his password "swordfish". Then, in January 2015, user Bob actively changes his password, and defines "elephant" as his new password. User Bob then accesses his account 15 times, using the new password "elephant". Then, in March 2015, user Bob forgets his password ("elephant"), or the need arises to authenticate the user without relying on that password. The system may then request from user Bob, to enter any Prior password (that was already expired or replaced), and may monitor the correctness of the entered string, as well as the manner in which the string is entered. For example, user Bob may enter his prior password "swordfish", in response to the challenge to enter a prior password; and the Prior Password Analyzer 157 may detect that both: (I) the content of the prior password is correct, namely, that the user Bob has indeed entered now a string that is identical to one of his prior passwords in this account; and also, (II) that the manner in which the user Bob has now entered the prior password, matches the manner in which the genuine user had entered that prior password in the past while it was still the non-expired password (e.g., in year 2014). The Prior Password Analyzer 157 may thus authorize or reject the authentication of the current user, based on a match of both (a) the content of the password that is now entered as a prior password, and (b) the manner in which that prior password is currently entered and which matches previous manners that were used to enter that prior password in the past while it was still the operational password for the account.

In some embodiments, a Partial Prior Password Analyzer 158 may operate to track and monitor the manner in which, during entry of a current password that the user does not remember correctly, the user types or operates in the same user-specific manner that the user had reflected in the past when typing a partial string or a subset of a previous password that was modified or that expired. For example, user Bob had used his password "swordfish" in the year 2014, across 45 log-in sessions. Then, in January 2015, user Bob changed his password to "catfish", and entered it correctly for 15 times. Then, in April 2015, user Bob forgets his current password "catfish", and instead he attempts (one time, or multiple times) to log-in by entering the word "starfish" as his password. The currently-entered password ("starfish") is incorrect; its content is not identical to the user's current correct password, and its content is not identical even to a prior password of the same user. However, the Partial Prior Password Analyzer 158 may detect that the manner in which the current user types the letters "fish", when he enters the incorrect string "starfish" as his password, is identical or is very similar (e.g., beyond a threshold value of similarity) to the manner in which the user used to type the letters "fish" in previous log-in sessions in 2015 in which he had typed "catfish", and/or is identical or is very similar (e.g., beyond a threshold value of similarity) to the manner in which the user used to type the letters "fish" in previous log-in sessions in 2015 in which he had types "swordfish". The Partial Prior Password Analyzer 158 may thus detect a user-specific characteristic in a manner in which the current user, who currently attempts to log-in or to access the service or the device, enters those letter ("fish"), and which matches the prior inputting of those letters as part of the current (correct) password in previous sessions, and/or which matches the prior inputting of those letters as part of a prior password (that already expired). This may be sufficient to authenticate the user, and/or to authorize the user to log-in or to reset his password, even though the user current recalls and/or enters correctly only a portion of his password ("fish"), and does not fully recall his entire current password ("catfish") and/or his entire prior password ("swordfish").

The Task Generator 152 may generate a task, which requests the user of the end-user device 101 to perform a particular task, by utilizing an input unit (e.g., mouse, touch-pad, touch-screen) of the end-user device 101; and may monitor and track the precise manner (e.g., gestures, interactions, device movements during the interaction and any other type of data that the device's sensors collect or produce during the interaction, and/or immediately prior to the interaction, and/or immediately after the interaction; including, but not limited to, data collected by or monitored by an accelerometer, a gyroscope, an orientation sensor, or the like) in which the user performs the requested task; and may analyze the monitored interactions to extract from them user-specific characteristics or user-specific features or a user-specific profile; which in turn may be used as user-identifying profile, instead of a password or in addition to a password, or in order to authorize a user to access the device or the service or to reset or recover his password. The present invention may thus comprise and enable cognitive behavioral biometric profiling of a user, or of multiple users, in a manner that enables user authentication and/or password recovery without requiring the user to define and/or remember personal responses to personal security questions.

In some embodiments, optionally, a Task Allocator 171 may ensure that each user or each usage-session, or each login attempt, or each end-user device, is assigned a different task or challenge; optionally by taking into account an analysis of the inputs that are entered by each user during his usage sessions and/or log-in sessions. For example, the Task Allocator 171 may optionally ensure that user Adam performs an enrollment process that requests user Adam to type the word "Goldberg", in order to extract therefrom a user-specific feature of the manner of entering that word; whereas, a different user Bob is required to perform a different enrollment process that requests user Bob to type the word "Philadelphia" in in order to extract therefrom a user-specific feature of the manner of entering that word.

The Task Allocator 171 may select the word "Philadelphia" as a user-identifying challenge for Bob, since user Bob has a user profile that indicates that he lives in Philadelphia and therefore there is increased probability that user Bob is proficient in typing this particular word and would probably exhibit a user-specific manner of typing it; whereas, user Adam is allocated the task to type "Goldberg" since the full name of Adam is Adam Goldstein, and the Task Allocator 171 predicts or estimates that the user Adam Goldberg would probably exhibit a user-specific manner to type the letters "Gold" which are part of his last name (but are not identical to his entire last name). The Task Allocator 171 may take into account other information, as well as contextual analysis of words or phrases that the user types or entered in the past and/or that are part of his user profile, in order to define or select or allocate a different user-specific challenge to each different user (e.g., of the system, or of a sub-group of users of the system); or to otherwise ensure that the challenge that is allocated to each user is indeed a challenge that is unique to that user, or a challenge that has increased probability (compared to a threshold probability level) to cause that particular user to exhibit his user-specific manner of entering the data and/or performing the task.

The system may thus utilize a User Interactions Monitoring Unit 177 to monitor the gestures and intricate details of interactions in performing the on-screen task or challenge, thereby enabling a User-Specific Features Extractor 159 to extract or estimate or determine user-specific features or attributes, and thereby enabling a Task-Based Behavioral Signature Generator 160 to construct or generate or assemble from them a user-specific behavioral signature or behavioral profile or behavioral feature-set; which may optionally be stored in a local repository (e.g., within the end-user device) and/or in Task-Based Behavioral Signature(s) Repository 161, for example, a remote repository (e.g., on a remote server or web-server or "cloud computing" server). The user-specific behavioral profile or signature or feature-set may be utilized in order to distinguish or differentiate between a first user and a second user; or between a first user and all other users; or between a genuine user and a fraudulent user (attacker, human imposter, computerized imposter, "bot", automated script); or in order to authenticate a user to a computerized service or to an end-user device (e.g., without requiring a password or passphrase or PIN, or as an additional security measure to such password or passphrase or PIN, or for password recover or password reset).

For example, a Task-Based Behavioral Signature Comparator 162 may compare between: (a) a fresh or current or ad-hoc behavioral signature that is extracted from a current performance of a task by a user who contends to be the genuine user; and (b) a historical or original or previously-determined task-based behavioral signature which had been extracted and stored for that original or genuine user. If the two task-based behavioral signatures are identical, or match each other, or are different from each other only by a relatively-insignificant percentage value that is smaller than a pre-defined threshold, then the user is authenticated to the end-user device or the computerized service.

It is noted that for demonstrative purposes, some portions of the discussion herein may relate to generating, selecting, performing and/or monitoring an On-Screen Task or challenge; such as, for example, drawing a shape on the screen with an on-screen pointer by using a mouse or a touch-screen or a touchpad, or entering or typing a word or a phrase; however, the terms "task" or "challenge" as used herein, and various other embodiments of the present invention, may comprise other types of Task and/or Challenge which may not necessarily be on-screen, and may not necessarily utilize or require a touch-screen or a screen or a mouse or a keyboard. For example, a task or challenge, that the system may generate and then monitor, may require the user to move or tilt or spin or rotate his end-user device (e.g., his smartphone, smart-watch, tablet) in the air (e.g., while holding the end-user device), at a particular angel or shape or pattern; for example, instructing the user "please life your smartphone 30 centimeters upward, then lower your smartphone 50 centimeters downward", while the accelerometer and/or gyroscope of the smartphone monitor the particular manner in which the user performs such task; or, instructing the user "please rotate your smartphone 180 degrees clockwise, and then 90 degrees counter-clockwise", while the accelerometer and/or gyroscope of the smartphone monitor the particular manner in which the user performs such task; or, instructing the user "please use your entire smartphone in order to draw in mid-air a shape of a circle", while the accelerometer and/or gyroscope of the smartphone monitor the particular manner in which the user performs such task; or otherwise instructing the user to perform other tasks or challenges using the entire end-user device (e.g., the entire housing or container or encapsulating unit of the end-user device), while the system tracks the specific pattern or user-specific characteristics(s) that characterize the manner in which the user performs that task. For example, the system may detect that user Adam typically draws a circle with the entire smartphone, while also tilting (or orienting) the entire device at 90 degrees (e.g., perpendicular to the ground at all time during the circling task in mid-air), and/or while also completing only 80% of a circle rather than a full circle; and these unique characteristics may be utilized as an authentication factor to authenticate the user, and/or as part of a user authentication process and/or log-in process and/or password recovery process and/or password reset process. Other suitable tasks and challenges may be used, which may not necessarily involve or require on-screen operations and/or typing, and which may utilize other suitable sensors or components of the end-user device in order to track and monitor the user-specific manner of performing such task or challenges and in order to extract from the user gestures (and/or from sensed parameters of the end-user device) a user-specific signature or feature or profile or characteristic.

The Applicants have further realized that a human user may be "trained" by a Task-Based Training Unit 163 to more efficiently or more quickly or more precisely perform his user-specific on-screen task; in a manner that enables the system, after several iterations of such "training", to more accurately distinguish between "trained" user Adam, and non-trained user Bob. For example, every time that user Adam logs-in to his online banking account, the system may request user Adam to type the word "hippopotamus", thereby training the user Adam to type this relatively-rare word (e.g., a word that most users rarely use when engaging with an online banking service, or even in their email messages or word processing documents) in a particular manner that is unique to user Adam. Subsequently, if user Adam forgets his password, the system may request him to type this particular word ("hippopotamus") that he was already pre-trained to type, thereby enabling the system to extract from such typing the user-specific manner that characterizes the trained user Adam when he types that word; and thereby enabling the system to differentiate between the genuine user Adam, and an attacker Carl who attempts to log-in and who is untrained in typing that word ("hippopotamus"), and will not exhibit the same user-specific manner that the trained user Adam exhibits.

In some embodiments, the system may learn on-the-fly the particular traits in which a new user performs an on-screen task, and may use them immediately (e.g., starting from the first or second iteration) for user authentication or for user identity detection. In other embodiments, the first K iterations of performing the on-screen task (e.g., K being an integer smaller than 50, or smaller than 20, or smaller than 10; for example, K being equal to 4 or 5 or 8), the system may only "learn" the particular characteristics of the manner in which user Adam performs and/or completes the task, without yet relying on them for actual user authentication; and only after such quota of training iterations are completed, or only if the system identifies sufficiently-unique user-specific features, only then would the system proceed to rely on the unique manner of performing the on-screen task as reliable means for user authentication.

For example, in some embodiments, the system may activate the security feature of the present invention; may then still require both manual entry of username and manual entry of password in order to access the computerized service or end-user device, and may still require the utilization of security questions in order to recover or reset a password; and may also request the user to perform the on-screen task while logging in (or immediately prior to, or after, logging-in), but without yet relying on the on-screen task performance for actual user authentication, and only monitoring and "learning" the user-specific traits while also at the same time "training" the user to perform the on-screen task more efficiently; and only after K iterations of performing the on-screen task without utilizing it for authentication, or only after K successful logins that included the on-screen task, only then would the system modify its log-in process or authentication process, or its password recovery process or its password reset process, to require the user to enter his username and to perform the on-screen task.

In accordance with the present invention, the particular and personal manner in which a user performs the on-screen task or challenge, is a user-specific trait that may be used for user authentication, and/or for distinguishing among users, and/or for confirming user identity, and/or for detecting a potential attacker or imposter (which may be human, or may be machine-based or a "bot" or malware or automated script).

In some embodiments, optionally, a Challenge Selector 175 may allow the genuine user (e.g., who is logged-in using his current password) to define or select his own challenge in order to recover or reset his password in the future. For example, user Adam may log-in to the system by entering his username ("AdamSmith") and his current password ("elephant"). Then, user Adam may access his "account settings" tab or page or section, and may select to "define a challenge for resetting my password in the future". Then, in one implementation, the Challenge Selector 175 may allow the logged-in user Adam to indicate that he wishes the word "California" to be the challenge that would be shown to him in the future in order to monitor his typing characteristics. Alternatively, in another implementation, the Challenge Selector 175 may ask the user whether in the future he would like to rely on the word "California" or on the word "Lizard" as a typing challenge for password recover or password reset purposes; and may store the challenge for future usage, based on the selection made by the logged-in user Adam.

It is noted that in some embodiments, the password recovery or password reset processes that are described above, or other user-authentication factor recovery or user-authentication factor reset or user-authentication factor replacement, may be implemented by a User-Authentication-Factor Resetting Module 191, which may be part of the user authentication module 150 or may be operably associated therewith; and which may operate by implementing one or more of the methods described above, and/or without requiring the user to remember or to submit one or more secret or confidential data-items, and/or without requiring the user to remember or to submit correct answers to previously-defined security questions.

In some embodiments, the resetting or recovery or replacement of the user-authentication-factor, based on the user-specific characteristic or feature or manner-of-operation or manner-of-behavior, may be utilized for replacing a defective or non-functional user authentication factor or user authentication unit (e.g., a faulty or defective imager or camera which is used for face recognition; a faulty or defective acoustic microphone which is used for speech recognition or voice recognition; a malfunctioning retina scanner or fingerprint scanner; or the like) with a different type of authentication factor or authentication unit (e.g., informing the user that the fingerprint scanner is faulty or does not operate successfully; and replacing the fingerprint authentication factor with, for example, facial recognition of a facial image of the user, or with voice recognition of the user's voice, and allowing the user to capture fresh face image and/or voice sample in order to initiate such replacement authentication factor(s)); or by replacing a defective sample that was used as an authentication factor with a fresh new sample that will subsequently be used as authentication factor (for example, the face recognition module fails to recognize the user Adam who now wears glasses and has a beard, that he did not have in a previous image sample; based on Adam's user-specific behavior in response to the task presented to him, a reset of the facial recognition factor may include, for example, allowing Adam to take a new photograph of his face as a fresh reference sample that will subsequently be used as authentication factor).

In accordance with other embodiments of the present invention, the user (or any user) does not select his own on-screen task or pattern from a pool of available (or offered) tasks or patterns; and the user does not modify the on-screen task, and does not replace it with another on-screen task; and does not edit, define and/or create by himself the on-screen task and/or pattern. This is in direct contrast with a password, a PIN or a passphrase, which are user-generated or user-defined, and which the user then needs to remember and to consciously convey (e.g., manually enter). Rather, in accordance with some embodiments of the present invention, the system automatically and autonomously generates (e.g., for each user, or for each device, or for each service) a suitable challenge that enables the system to extract from it a user-specific manner of performing the task or challenge. In some embodiments, the system does not allow and does not enable a user to switch or to modify the on-screen task or challenge that were allocated to him.

The present invention may enable to create and to utilize a personal and unique and user-specific biometric trait or identifier, which may not be susceptible to duplication or copying; in direct contrast with a human fingerprint, which is also a unique biometric trait but which can be copied or duplicated by some attackers.

The present invention may optionally be utilized in conjunction with an existing smartphone, tablet, or other configuration of end-user device, without the need to necessarily add or install or connect a new biometric sensor (e.g., a fingerprint scanner or reader); thereby allowing, for example, low-cost deployment, efficient deployment, and/or small form-factor deployment of systems that utilize the present invention.

Some embodiments of the present invention may optionally utilize a two-fold mechanism, in which the user is required to perform an on-screen task, while also an interference or aberration is injected to the user-interface or to the task itself by an Interference Injector 151. For example, optionally, while the user is performing the on-screen challenge, the on-screen pointer may deviate or disappear or re-appear in a different location, or a typographical error may be injected into the field being typed; thereby requiring the user to notice the aberration or abnormality and to react to the aberration or abnormality (e.g., by performing corrective manual gestures). This, in turn, may further enable the system to authenticate the user, not only based on the user's response to the challenge presented to him (e.g., type the word "California"), but also by taking into account the user's reaction and/or corrective gestures in response to an injected aberration or interference (e.g., the manner and/or speed in which the user detects and/or corrects a spelling error or typing error that is introduced while the user is typing that word).

The user's reaction to the aberration, the attributes of the reaction (e.g., how long it took the user to notice and/or to correct), and the manner and attributes of the corrective action(s), may be analyzed and extracted and used as additional user-specific traits, in order to generate a user-specific profile that is more reliable and/or which relies on an increased depth of user-specific data, or is based on a larger user-specific data-set of user-specific features. In some embodiments, the injection of an aberration (or multiple aberrations) to the performance of the on-screen task, may increase the entropy of the system, and/or may increase the uniqueness of the manner in which the specific user performs the on-screen task presented to her; and/or may assist in "training" the particular user to be different and unique relative to other users; and/or in order to more efficiently identify or detect an attacker or an imposter.

In some embodiments, the requirement for a user to perform the on-screen task, may be additional to or alternative to other authentication methods (e.g., entering of a password or passphrase or PIN, or scanning a fingerprint or retina, or uttering speech or voice, or capturing a facial image for face recognition), or may be cumulative or augmenting to various other types of user authentication and/or fraud detection.

In some embodiments, the requirement for a user to perform the on-screen task or challenge, may be utilized as one of the steps in a two-step (or multi-step) authentication process; or may be utilized as one of the factors in a two-factor (or multi-factor) authentication process.

In some embodiments, the requirement for a user to perform the on-screen task or challenge, may be utilized as a "secret question" in a password recovery or password reset process; namely, as one of the means for the user to confirm his identity to a system in order to reset or recover a forgotten password, or in order to reset a defective (e.g., non-working) password.

In some embodiments, the system may "train" the user, over K iterations, to efficiently and proficiently perform his unique on-screen task; thereby "training" the user to be familiar with his personal task, and allowing his manner of performing that task to be more consistent, un-changing, and even more unique as a "behavioral signature" relative to the rest of the population. In some embodiments, the authentication process may utilize: (a) the fact realized by the Applicants, that each user performs a particular task differently and uniquely relative to other users; (b) the fact realized by the Applicants, that a user who "trained" to perform his particular task, performs that task in a more proficient or more efficient or more accurate manner, relative to that user performing a new task that he encounters for the first time; (c) optionally, the fact realized by the Applicants, that injecting an input/output interference or anomaly or aberration, to the performance of the task, may further contribute to the uniqueness of the user-extracted traits or the extracted "behavioral signature", and/or may further improve the differentiation between the legitimate user and other user(s) such as an attacker or impostor.

The present invention may thus "learn" or deduce, over multiple iterations or log-in sessions, the particular "behavioral signature" of each user, reflecting the particular's user attributes of his unique manner of performing the task; and such "behavioral signature" may be stored in a long-term repository, a short-term repository, a local repository within the end-user device, a remote repository on a remote server or a "cloud computing" server, or the like.

During a subsequent log-in attempt or access attempt or authentication attempt, the system may present the same task for performance and completion, and may monitor and track the current user-specific traits that are reflected in current user gestures, thereby generating a current, ad hoc, "behavioral signature" of the current user. The system may compare the current behavioral signature with the historic or previously-stored behavioral signature, in order to determine whether the current user who is attempting to access the service (or the device) is indeed the same human user as the human user who had been initially presented with the same task (e.g., upon activation or initiation of a user account for that service; or upon initial activation of the end-user device).

In some embodiments, optionally, Enrollment Module(s) of the system may perform an enrollment process; in which a user or a new user is requested to perform the same user-specific task, several times (e.g., K times, five times, ten times) in a row, in order to rapidly establish a data-set of generally-consistent user-specific traits that characterize that user when he performs that task; optionally discarding the first one or two or three iterations data; and/or optionally using a weighting formula to allocate a greater weight to latter task-performing sessions, and to allocate a smaller weight to earlier or initial task-performing sessions. In other embodiments, no such formal or visible "enrollment process" is needed; and rather, the system may autonomously learn over time, or over K iterations or login sessions or login attempts, to extract or to identify the consistent user-specific traits.

The present invention may be utilized in a variety of implementations and systems. In a first example, a tablet or a smartphone or a dashboard or a device having a touch-screen may be placed at an entrance to an access-controlled physical area (e.g., building, room, floor in a building, organization, office); and users may be required to perform an initial advance registration process, such that each authorized user (who is allowed to enter the physical area) would be associated with a particular user-specific task that can be performed on that touch-screen. Subsequently, that touch-screen device may be used as an authentication terminal, requiring each guest or visitor to authenticate by entering his name or username, then presenting to the user his suitable pre-defined on-screen task, and then allowing (or blocking) the user's physical entry based on the behavioral traits of how the user performs that task. This may be an addition to, or an alternative to, other user authentication methods for entering a secure area or a controlled-access physical location (such as, showing a badge or an I.D. card; scanning a barcode; showing a token; retina scan; fingerprint scan; voice recognition or voice signature; or the like).

In another example, a tablet or a smartphone or a dashboard or a device having a touch-screen may be embedded in (or connected to) a vehicle, or a vehicular dashboard; such that starting the vehicles motor, and/or driving the vehicle, may be conditioned upon the user (e.g., the driver) performing the pre-defined task on the touch-screen, in the same manner that would yield the same behavioral signature that had been defined for the legitimate user (e.g., the car owner or the previously-authorized driver). The device of the present invention may thus be utilized in order to allow or to block access to a vehicle, or in order to allow or block an attempt to start a vehicle or to drive a vehicle. Similarly, the invention may be used with allowing or blocking access to various electronic devices, electric devices, kitchen appliances, household appliances (e.g., a television set, a smart television), a gaming device or gaming console, or the like.

It is noted that for demonstrative purposes, some portions of the discussion herein may relate to an on-screen task that is performed via a touch-screen; or to a typing of a challenge word or phrase; however, other suitable tasks may be used, which may not necessarily involve connecting such operations, and which may not necessarily require or involve a touch-screen and/or a keyboard. In a first example, the user-specific task may require the user to utilize a mouse of a computer, in order to trace an on-screen trail or route, or in order to connect dots or icons on the screen, vie mouse gestures or via touch-pad gestures, and without dragging a finger over a touch-screen. In a second example, the user may be requested to perform certain gestures on the touch-screen or via another input unit (mouse, keyboard), such as typing a particular phrase via a physical keyboard or an on-screen keyboard, as an input task that is analyzed and from which user-specific behavioral traits are extracted and are then assembled or fused into a user-specific behavioral signature which is subsequently used for user authentication.

It is noted that in accordance with the present invention, monitoring and/or analyzing of "user interactions" and/or "user gestures", may further comprise the monitoring and/or analyzing of interactions, gestures, and/or sensed data that is collected shortly before or immediately before the actual interaction, and/or interactions, gestures, and/or sensed data that is collected shortly after or immediately after the actual interaction; in addition to the data collected or sensed or monitored during the interaction itself.

It is noted that in accordance with the present invention, the "user interaction data" may comprise, for example, any data that is sensed or captured by the end-user device or by any sensors thereof or by other (e.g., external) sensors, and which may relate directly or indirectly to the user interaction or to the input-output exchange between the user and the device (or the service). For example, data sensed by the accelerometer and/or gyroscope(s) and/or orientation sensor(s) of the end-user device, during the interaction and/or shortly prior to the interaction and/or shortly after the interaction, may be utilized as part of the data from which a user-specific behavioral profile or cognitive biometric profile is generated; for example, identifying that user Adam typically orients his smartphone at a 30 degrees angle during the actual touch-screen interaction; identifying that user Bob typically rotates his smartphone clockwise by 20 degrees immediately prior to performing a touch-screen gestures; identifying that use Carl typically causes a movement sideways, or a movement to the left side, or a tilting to a certain direction, of the entire electronic device, prior to the interaction (the task performance) or immediately prior to it or immediately after it; or the like.

It is noted that in some embodiments, the user authentication or controlled access methods of the present invention, may optionally be used in conjunction with sensing and/or analyzing other user-specific features or biometric traits; for example, using an image or photo or video of the user (e.g., before or during or after the actual interaction is performed), or using an audio or speech utterance or voice utterance by the user (e.g., before or during or after the actual interaction is performed), face recognition, retina scanning, speech analysis, fingerprints, and/or other biometric features and/or user-specific characteristics. For example, the image or voice of the user, may be utilized as an assisting parameter in the decision whether or not the current user, who is performing the required task by interactions or gestures, is indeed the genuine user. For example, if the system of the present invention is utilized in order to authorize or reject the access of a user into a building or a vehicle, then utilization of the user's image and/or voice may further be used as part of the decision-making process in which the user is authenticated or is blocked.

The terms "mobile device" or "mobile electronic device" as used herein may include, for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, or the like.

The term "pointing device" as used herein may include, for example, a mouse, a trackball, a pointing stick, a stylus, a joystick, a motion-sensing input device, a touch screen, a touch-pad, or the like.

The terms "device" or "electronic device" as used herein may include, for example, a mobile device, a non-mobile device, a non-portable device, a desktop computer, a workstation, a computing terminal, a laptop computer, a notebook computer, a netbook computer, a computing device associated with a mouse or a similar pointing accessory, or the like.

The term "genuine user" as used herein may include, for example, an owner of a device; a legal or lawful user of a device; an authorized user of a device; a person who has legal authorization and/or legal right to utilize a device, for general purpose(s) and/or for one or more particular purpose(s); or the person who had originally defined user credentials (e.g., username and password) for performing an activity through the device.

The term "fraudulent user" as used herein may include, for example, any person who is not the "genuine user" of the device; an attacker; an intruder; a man-in-the-middle attacker; a man-in-the-browser attacker; an unauthorized user; an impersonator; a hacker; a cracker; a person attempting to hack or crack or compromise a security measure utilized by the device or by a system or a service or a website, or utilized by an activity or service accessible through the device; a fraudster; a human fraudster; a "bot" or a malware or an automated computerized process (e.g., implemented by using software modules and/or hardware components) which attempts to imitate human behavior or which attempts to act as if such "bot" or malware or process was the genuine user; or the like.

The present invention may be used in conjunction with various suitable devices and systems, for example, various devices that have a touch-screen; an ATM; a kiosk machine or vending machine that has a touch-screen; a touch-keyboard; a system that utilizes Augmented Reality (AR) components or AR glasses (e.g., Google Glass®); a device or system that may detect hovering gestures that do not necessarily touch on the screen or touch-screen; a hovering screen; a system or device that utilize brainwave analysis or brainwave control in which the user's brainwaves are captured or read and the user's brain may directly control an application on the mobile device; and/or other suitable devices or systems.

Some embodiments may identify multiple (different) users that utilize the same device, or the same account, before or after a typical user profile is built, or even during a training period in which the system learns the behavioral patterns. This may be used for detection of "friendly fraud" incidents, or identification of users for accountability purposes, or identification of the user that utilized a particular function in an Administrator account (e.g., optionally used in conjunction with a requirement that certain users, or users with certain privileges, may not share their password or credentials with any other person); or identification of a licensee in order to detect or prevent software piracy or unauthorized usage by non-licensee user(s), for software or products that are sold or licensed on a per-user basis or a per-seat basis.

In some embodiments, the present invention may be utilized to decrease (or increase, or modify) friction from a password reset process or password recovery process or a user-authentication-factor reset (or recovery, or replacement) process. For example, instead of presenting one or more (or multiple) security questions to the user, a recovery process may present to the user the challenge to type a word or phrase, or to draw an on-screen image or shape, in a manner that exhibits user-specific traits that characterize the genuine user (the genuine account user) as reflected in previous usage session(s) of the genuine account owner.

Some embodiments may be utilized to identify or detect a remote access attacker, or an attacker or a user that utilizes a remote access channel to access (or to attack, or to compromise) a computerized service, or an attacker or cyber-attacker or hacker or impostor or imposter or "fraudster" that poses as a genuine user or as a true owner of an account, or an automatic script or "bot" or malware. Some embodiments may be used to differentiate or distinguish among, for example, an authorized or legitimate or genuine or human user, as opposed to an illegitimate and/or unauthorized and/or impostor human attacker or human user, and/or as opposed to a "bot" or automatic script or automated script or automated program or malware.

Some embodiments may be utilized for authenticating, or confirming the identity of, a user who is already logged-in or signed-in; or conversely, a user that did not perform (or did not yet perform, or did not complete) a log-in or sign-in process; or a user that did not successfully perform a log-in or sign-in process; or a user who is interacting with a computerized service prior to signing-in or logging in (e.g., filling-out fields in an electronic commerce website as part of checking-out as a guest), or during a log-in process, or after a log-in process; or to confirm the identity of a user who is already-logged-in, or who is not-yet logged-in, or who operates a system or service that does not necessarily require or utilize a log-in process.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a legend list or a database of possible values or ranges; a comparison or matching or searching process which searches for matches and/or identical results and/or similar results among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

In some embodiments, a method comprises: determining that a current user, that (i) fails to perform an authentication process for accessing a service or (ii) requests to perform a reset process for a user-authentication factor of said service, is a genuine user that is authorized to reset said user-authentication factor of said service, by performing: (a) presenting to the current user a fresh task that the current user is required to perform and that can be tracked by the service; (b) monitoring a manner in which the current user performs the fresh task; (c) extracting from said manner in which the current user performs the fresh, a fresh user-specific characteristic; (d) comparing between (I) the fresh user-specific characteristic, that is extracted from the manner in which the current user performs the fresh task, and (II) a previously-extracted user-specific characteristic that was previously extracted from prior user interactions of the genuine user; (e) if there is a match between (I) the fresh user-specific characteristic, that is extracted from the manner in which the current user performs the fresh task, and (II) the previously-extracted user-specific characteristic that was previously extracted from prior user interactions of the genuine user, then determining that the current user is the genuine user that is authorized to reset said user-authentication factor of said service.

In some embodiments, step (e) comprises: if there is a match between (I) the fresh user-specific characteristic, that is extracted from the manner in which the current user performs the fresh task, and (II) the previously-extracted user-specific characteristic that was previously extracted from prior user interactions of the genuine user, then: determining that the current user is the genuine user that is authorized to reset said user-authentication factor of said service, and performing a reset of the user-authentication factor.

In some embodiments, the method comprises: prior to a current usage session in which the current user attempts to authenticate to the service, performing: during a single prior usage session, requiring the user to perform a task; and during said single prior usage session, extracting from user interactions of the user performing said task a user-specific characteristic, that is subsequently utilized for identifying the current user during a process of resetting a user-authentication factor.

In some embodiments, the method comprises: prior to a current usage session in which the current user attempts to authenticate to the service, performing: during a set of multiple prior usage sessions, requiring the user to perform a task; and during said multiple prior usage sessions, extracting from user interactions of the user performing said task a user-specific characteristic, that is subsequently utilized for identifying the current user during a process of resetting a user-authentication factor.

In some embodiments, the method comprises: prior to a current usage session in which the current user attempts to authenticate to the service, performing: during a single log-in process of a single prior usage session, requiring the user to perform a task; and during said single log-in process of said single prior usage session, extracting from user interactions of the user performing said task a user-specific characteristic, that is subsequently utilized for identifying the current user during a process of resetting a user-authentication factor.

In some embodiments, the method comprises: prior to a current usage session in which the current user attempts to authenticate to the service, performing: during a set of multiple log-in processes of a plurality of prior usage sessions, requiring the user to perform a task; and during said multiple log-in processes of said plurality of prior usage sessions, extracting from user interactions of the user performing said task a user-specific characteristic, that is subsequently utilized for identifying the current user during a process of resetting a user-authentication factor.

In some embodiments, the method comprises: (A) receiving from the current user a fresh input that the current user alleges to be a correct password for an account of said user; (B) determining that the fresh input submitted by the current user, is not the correct current password of said account, but is identical to a prior password that was associated with said account in the past and expired; (C) further determining that a manner in which the current user entered the fresh input, exhibits a same user-specific manner that was exhibited in the past when said prior password was a valid password and was entered in the past to access said account; (D) based on both the determining of step (B) and the determining of step (C), further determining that the current user is the genuine user that is authorized to reset said password of said account.

In some embodiments, the method comprises: (A) receiving from the current user a fresh input that the current user alleges to be a correct password for an account of said user; (B) determining that the fresh input submitted by the current user, is not the correct current password of said account, but contains a string that is identical to a subset of a prior password that was associated with said account in the past and expired; (C) further determining that a manner in which the current user entered said string of the fresh input, exhibits a same user-specific manner that was exhibited in the past when said prior password was a valid password and was entered in the past to access said account; (D) based on both the determining of step (B) and the determining of step (C), further determining that the current user is the genuine user that is authorized to reset said password of said account.

In some embodiments, the method comprises: (A) receiving from the current user a fresh input that the current user alleges to be a correct password for an account of said user; (B) determining that the fresh input submitted by the current user, is not the correct current password of said account; (C) requesting from the current user to input a prior password, that was associated with said account in the past and already expired; (D) determining that the current user enters a new string, which is identical to said prior password, and which is entered by the current user in a same user-specific manner that was exhibited in the past when the prior password was valid for said account; (E) based on the determining of step (D), determining that the current user is the genuine user that is authorized to reset said password of said account.

In some embodiments, the method comprises: while the user is performing the task, injecting an input/output aberration to a behavior of an input unit that the current user utilizes; tracking a reaction of the user to the input/output aberration; extracting from said reaction a user-specific reaction characteristic; and determining whether the current user is authorized to reset said user-authentication factor by taking into account the user-specific reaction characteristic.

In some embodiments, the method comprises: while the user is performing the task, injecting an input/output aberration to a behavior of an input unit that the current user utilizes; tracking a corrective gesture of the user to the input/output aberration; extracting from said corrective gesture a user-specific corrective characteristic; and determining whether the current user is authorized to reset said user-authentication factor by taking into account the user-specific corrective characteristic.

In some embodiments, the method comprises: during a first K usage-sessions of the user with the computerized service, wherein K is a positive integer: requiring the user perform the task, without yet relying for user authentication purposes on a user-specific characteristic that is exhibited in user performance of the task during said first K usage-sessions; starting at the K+1 usage-session of the user with the computerized service, relying for user authentication purposes on a user-specific characteristic that was exhibited in user performance of the task during said first K usage-sessions.

In some embodiments, said task is utilized as a condition for granting access to the user to a physical location. In some embodiments, said task is utilized as a condition for granting access to the user to a vehicle. In some embodiments, said task is utilized for user authentication as part of a multi-factor authentication process.

In some embodiments, the method comprises: collecting user interactions data both (i) during performance of the task, and (ii) immediately prior to performance of the task; generating a user-specific profile based on both (I) the user interactions during performance of the task, and (II) the user interactions immediately prior to performance of the task.

In some embodiments, the method comprises: collecting user interactions data both (i) during performance of the task, and (ii) immediately after performance of the task; generating a user-specific profile based on both (I) the user interactions during performance of the task, and (II) the user interactions immediately after performance of the task.

In some embodiments, the method comprises: collecting user interactions data both (i) during performance of the task, and (ii) immediately after performance of the task, and (iii) immediately prior to performance of the task; generating a user-specific profile based on both (I) the user interactions during performance of the task, and (II) the user interactions immediately after performance of the task, and (III) the user interactions immediately prior to performance of the past.

In some embodiments, the method comprises: collecting user interactions data, by both (i) collecting user interactions data via the input unit, and (ii) collecting one or more sensed parameters that are sensed via a sensor of the electronic device during task performance; generating a user-specific biometric based on both (I) the user interactions via the input unit during performance of the task, and (II) the one or more sensed parameters that are sensed via said sensor of the electronic device during task performance.

In some embodiments, the method comprises: collecting user interactions data, by both (i) collecting user interactions data via the input unit, and (ii) collecting one or more send device-acceleration parameters that are sensed via an accelerometer of the electronic device during task performance; generating a user-specific biometric based on both (I) the user interactions via the input unit during performance of the task, and (II) the one or more device-acceleration parameters that are sensed via said accelerometer of the electronic device during task performance.

In some embodiments, the method comprises: collecting user interactions data, by both (i) collecting user interactions data via the input unit, and (ii) collecting one or more send device-orientation parameters that are sensed via a gyroscope of the electronic device during task performance; generating a user-specific biometric based on both (I) the user interactions via the input unit during performance of the task, and (II) the one or more device-orientation parameters that are sensed via a gyroscope of the electronic device during task performance.

In some embodiments, the method comprises: generating an entire-device task, which requires the current user to move an entirety of the end-user device in a particular spatial pattern, and which does not require the current user to type characters, and which does not require the current user to utilize an on-screen pointer; utilizing one or more physical sensors of the end-user device to monitor a manner in which the end-user device is moved while the current user performs said entire-device task; extracting from said manner, a user-specific feature that reflects a user-specific manner in which the end-user device was moved by the current user as he performed the entire-device task; based on said user-specific feature, determining that the current user is the genuine user that is authorized to reset the user-authentication factor of the service.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A method comprising:
(AA) monitoring input-user interactions of a user, that utilizes an electronic device to access a computerized service;
(BB) analyzing said input-user interactions, and identifying a particular word that the user typed multiple times in a user-specific typing manner;
subsequently,
(CC) determining that a current user, that (i) fails to perform an authentication process for accessing said computerized service or (ii) requests to perform a reset process for a user-authentication factor of said computerized service, is a genuine user that is authorized to reset said user-authentication factor of said computerized service, by performing:
(a) constructing a unique multiple-word phrase, which comprises (i) said particular word that was identified in step (BB), and also (ii) one or more other words; and presenting to the current user a fresh task that requires the current user to type said unique multiple-word phrase;
(b) monitoring a fresh manner in which the current user types said unique multiple-word phrase;
(c) determining whether or not fresh typing of said unique multiple-word phrase as monitored in step (b), exhibits during typing of said particular word the user-specific typing manner that was identified in step (BB) during repeated previous typing of said particular word;
(d) if the determining of step (c) is positive, then determining that the current user is the genuine user that is authorized to reset said user-authentication factor of said service.

2. The method of claim 1, wherein step (c) comprises:
determining whether there is a match between (I) a fresh user-specific characteristic, that is extracted from the fresh manner in which the current user performs typing of said unique multiple-word phrase in step (b), and (II) a previously-extracted user-specific characteristic that was previously extracted from prior user interactions of the genuine user when he typed said particular word multiple types in steps (AA) and (BB).

3. The method of claim 1, comprising:
injecting an input/output aberration to a behavior of an input unit that the current user utilizes;
tracking a reaction of the user to the input/output aberration;
extracting from said reaction a user-specific reaction characteristic; and
determining whether the current user is authorized to reset said user-authentication factor by taking into account both (i) the user-specific reaction characteristic, and (ii) a result of the determining of step (c).

4. The method of claim 1, comprising:
injecting an input/output aberration to a behavior of an input unit that the current user utilizes;
tracking a corrective gesture of the user to the input/output aberration;
extracting from said corrective gesture a user-specific corrective characteristic; and
determining whether the current user is authorized to reset said user-authentication factor by taking into account both (i) the user-specific corrective characteristic, and (ii) a result of the determining of step (c).

5. The method of claim 1, wherein said user authentication factor is utilized as a condition for granting access to the user to a physical location.

6. The method of claim 1, wherein said user authentication factor is utilized as a condition for granting access to the user to a vehicle.

7. The method of claim 1, wherein said user authentication factor is utilized for user authentication as part of a multi-factor authentication process.

* * * * *